United States Patent
Kumar KN et al.

(10) Patent No.: US 10,942,499 B2
(45) Date of Patent: Mar. 9, 2021

(54) INTRINSIC SAFETY (IS) BARRIER WITH ASSOCIATED ENERGY LIMITING APPARATUS

(71) Applicant: Honeywell International Inc., Morris Plains, NJ (US)

(72) Inventors: Dinesh Kumar KN, Bangalore (IN); Sai Krishnan Jagannathan, Bangalore (IN); Murali Krishna Bezawada, Hyderabad (IN)

(73) Assignee: Honeywell International Inc., Charlotte, NC (US)

( * ) Notice: Subject to any disclaimer, the term of this patent is extended or adjusted under 35 U.S.C. 154(b) by 103 days.

(21) Appl. No.: 16/008,941

(22) Filed: Jun. 14, 2018

(65) Prior Publication Data

US 2019/0056708 A1 Feb. 21, 2019

Related U.S. Application Data

(60) Provisional application No. 62/546,483, filed on Aug. 16, 2017.

(51) Int. Cl.
*G05B 19/042* (2006.01)
*H02H 9/00* (2006.01)
*G06F 9/445* (2018.01)
*G06F 13/40* (2006.01)

(52) U.S. Cl.
CPC ....... *G05B 19/0425* (2013.01); *G05B 19/042* (2013.01); *G05B 19/0428* (2013.01); *G06F 9/44505* (2013.01); *G06F 13/4072* (2013.01); *H02H 9/008* (2013.01)

(58) Field of Classification Search
None
See application file for complete search history.

(56) References Cited

U.S. PATENT DOCUMENTS

| | | | |
|---|---|---|---|
| 3,973,170 | A | 8/1976 | Hogan |
| 4,412,265 | A | 10/1983 | Buuck |
| 4,954,923 | A | 9/1990 | Hoeflich et al. |
| 5,835,534 | A | 11/1998 | Kogure |
| 6,397,322 | B1 | 5/2002 | Voss |

(Continued)

OTHER PUBLICATIONS

"AN9003—A Users Guide to Intrinsic Safety; Reasons for selecting the Intrinsically Safe Concept", Cooper Crouse-Hinds MTL Inc., May 2013, 20 pages.

(Continued)

*Primary Examiner* — Mohammad Ali
*Assistant Examiner* — Saad M Kabir
(74) *Attorney, Agent, or Firm* — Paschall & Associates, LLC; James C. Paschall; Anthony Miologos

(57) ABSTRACT

A method and apparatus is disclosed that includes first and second hardware components. The first component includes at least one first input configured to receive at least one first data or power signal, at least one voltage clamping circuit configured to limit a voltage of the at least one first data or power signal, and at least one first output configured to provide the at least one voltage-limited first data or power signal. The second component includes at least one second input configured to receive at least one second data or power signal, at least one limiter circuit configured to limit an amount of energy in the at least one second data or power signal, and at least one second output configured to provide the at least one energy-limited second data or power signal.

20 Claims, 5 Drawing Sheets

(56) References Cited

U.S. PATENT DOCUMENTS

| | | |
|---|---|---|
| 6,750,808 B2 | 6/2004 | Faust |
| 6,992,467 B1 | 1/2006 | Fey |
| 7,463,470 B2 | 12/2008 | Lark |
| 9,680,261 B2 | 6/2017 | Arul et al. |
| 2004/0066588 A1 | 4/2004 | Flasza et al. |
| 2005/0024160 A1 | 2/2005 | Vazach et al. |
| 2016/0146924 A1 | 5/2016 | Williams |

OTHER PUBLICATIONS

"TDC 3000X Galvanic Isolation/Intrinsic Safety Field Termination Assemblies Specification and Technical Data", Honeywell, R500, Jun. 1996, 20 pages.

"Wiring Practices for Hazardous (Classified) Locations Instrumentation Part 1: Intrinsic Safety", Instrument Society of America, Aug. 1995, 52 pages.

Eiabiarz, "Intrinsic Safety Circuit Design", Instrument Society of America, Oct. 1992, pp. Z-131 to Z-148.

Kumar KN et al., "Intrinsic Safety (IS) Barriers Mountable on Terminal Blocks of Input/Output (I/O) Modules or Other Devices," U.S. Appl. No. 16/043,288, filed Jul. 24, 2018, 41 pages.

INTRINSIC SAFETY (IS) BARRIER WITH ASSOCIATED ENERGY LIMITING APPARATUS

CROSS-REFERENCE TO RELATED APPLICATION AND PRIORITY CLAIM

This application claims priority under 35 U.S.C. § 119(e) to U.S. Provisional Patent Application No. 62/546,483 filed on Aug. 16, 2017. This provisional application is hereby incorporated by reference in its entirety.

TECHNICAL FIELD

This disclosure generally relates to electrical safety barriers. More specifically, this disclosure relates to an intrinsic safety (IS) barrier with an associated energy limiting apparatus.

BACKGROUND

Industrial process control and automation systems are often used to automate large and complex industrial processes. These types of systems routinely include various components including sensors, actuators, and controllers. Some of the controllers can receive measurements from the sensors, possibly through connected input/output (I/O) subsystems, and generate control signals for the actuators. Existing process control and automation systems typically have hardware components participating in control and I/O functions that are installed in control rooms and in the field. These hardware components are often used to gather I/O information from the field, transmit that I/O information to the control rooms, perform various control functions, and transmit I/O information back to the field.

In hazardous environments, it may be necessary or desirable to limit and isolate critical I/O functions or other functions using intrinsic safety (IS) barriers. Intrinsic safety barriers implement protection techniques that limit electrical or thermal energy available in the hazardous environments. This helps to ensure safe operation of electrical equipment in the hazardous environments and limits the electrical or thermal energy available for ignition in the hazardous environments. As a particular example, intrinsic safety barriers can be used to limit the electrical or thermal energy available in environments that contain flammable or explosive gasses, liquids, or other materials.

SUMMARY

This disclosure provides an intrinsic safety (IS) barrier with an associated energy limiting apparatus.

In a first embodiment, an apparatus includes a first hardware component and a second hardware component. The first hardware component includes at least one first input configured to receive at least one first data or power signal. The first hardware component also includes at least one voltage clamping circuit configured to limit a voltage of the at least one first data or power signal. The first hardware component further includes at least one first output configured to provide the at least one voltage-limited first data or power signal. The second hardware component includes at least one second input configured to receive at least one second data or power signal, where the at least one second data or power signal comprises or is based on the at least one voltage-limited first data or power signal. The second hardware component also includes at least one limiter circuit configured to limit an amount of energy in the at least one second data or power signal. The second hardware component further includes at least one second output configured to provide the at least one energy-limited second data or power signal.

In a second embodiment, a system includes at least one input/output (I/O) module that includes at least one I/O channel. The system also includes at least one intrinsic safety barrier. Each intrinsic safety barrier includes a first hardware component and a second hardware component. The first hardware component includes at least one first input configured to receive at least one first data or power signal. The first hardware component also includes at least one voltage clamping circuit configured to limit a voltage of the at least one first data or power signal. The first hardware component further includes at least one first output configured to provide the at least one voltage-limited first data or power signal to the at least one I/O module. The second hardware component includes at least one second input configured to receive at least one second data or power signal from the at least one I/O module. The second hardware component also includes at least one limiter circuit configured to limit an amount of energy in the at least one second data or power signal. The second hardware component further includes at least one second output configured to provide the at least one energy-limited second data or power signal.

In a third embodiment, a method includes coupling a first hardware component of an intrinsic safety barrier to a first device. The first hardware component includes at least one first input configured to receive at least one first data or power signal. The first hardware component also includes at least one voltage clamping circuit configured to limit a voltage of the at least one first data or power signal. The first hardware component further includes at least one first output configured to provide the at least one voltage-limited first data or power signal to the first device. The method also includes coupling a second hardware component of the intrinsic safety barrier to the first device. The second hardware component includes at least one second input configured to receive at least one second data or power signal, where the at least one second data or power signal comprises or is based on the at least one voltage-limited first data or power signal. The second hardware component also includes at least one limiter circuit configured to limit an amount of energy in the at least one second data or power signal. The second hardware component further includes at least one second output configured to provide the at least one energy-limited second data or power signal to one or more second devices.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
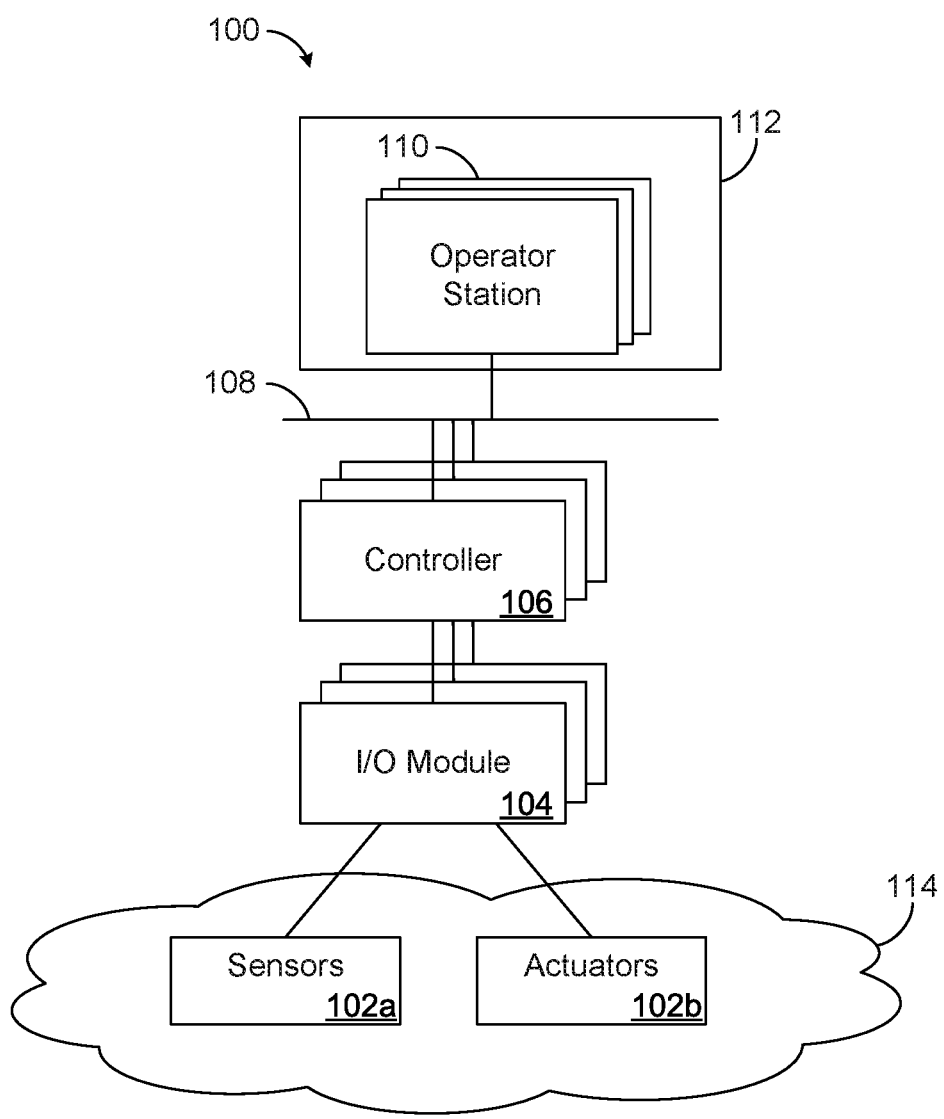
FIG. 1 illustrates an example industrial process control and automation system according to this disclosure.

FIGS. 1 through 5, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As noted above, industrial process control and automation systems typically have hardware components participating in various control and input/output (I/O) functions. In hazardous environments, it may be necessary or desirable to limit and isolate critical I/O functions or other functions using intrinsic safety (IS) barriers, which implement protection techniques that limit electrical or thermal energy available in the hazardous environments. This helps to ensure safe operation of electrical equipment in the hazardous environments and limits the electrical or thermal energy available for ignition in the hazardous environments. In other words, intrinsic safety barriers help to facilitate the use of electrical equipment in hazardous environments by reducing or eliminating the likelihood that the electrical equipment could cause explosions or other problems in the hazardous environments.

Conventional intrinsic safety barriers are often single-channel barriers, meaning each barrier can only be used with a single I/O channel. Conventional intrinsic safety barriers are also often general-purpose barriers, meaning the barriers are typically designed for a wide range of applications in various environments. As a result, a large number of intrinsic safety barriers may be needed in systems having a large number of I/O channels, and these intrinsic safety barriers may occupy a large amount of space. In some cases, a control room could need dedicated cabinets and power supplies just for single-channel intrinsic safety barriers. Moreover, because conventional intrinsic safety barriers are general-purpose components, these conventional barriers are often generic components that need to satisfy a large number of requirements for use in different environments. This can increase the number of components in the intrinsic safety barriers, as well as the size and cost of the intrinsic safety barriers. As a specific example, general-purpose intrinsic safety barriers often undergo rigorous assessments under IEC 60079-xx standards, and a 250V assessment can often force hardware to be designed with high-capacity safety devices with high creepage and clearance. This leads to larger sizes of intrinsic safety barriers, which in turn reduces channel densities in a given cabinet. In addition, because they are general-purpose components, conventional intrinsic safety barriers are often not configurable, so different intrinsic safety barriers are needed for different types of I/O channels.

This disclosure describes approaches for integrating intrinsic safety barriers into specific hardware, where only the desired functionality is packaged with the hardware. As a result, the overall sizes of the integrated intrinsic safety barriers can be reduced, and channel densities can be improved. The intrinsic safety barriers are also implemented using a miniature form factor. Again, the size and cost of the intrinsic safety barriers can be reduced, which can also help to provide improved channel densities. In addition, because the functionality of the intrinsic safety barriers could be limited to only the functionality that is actually needed, the barriers could be easier to design, develop, and certify.

FIG. 1 illustrates an example industrial process control and automation system 100 according to this disclosure. As shown in FIG. 1, the system 100 includes various components that facilitate production or processing of at least one product or other material. For instance, the system 100 can be used to facilitate control or monitoring of components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials or energy in different forms in some manner.

In the example shown in FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. Each of the sensors 102a includes any suitable structure for measuring one or more characteristics in a process system. Each of the actuators 102b includes any suitable structure for operating on or affecting one or more conditions in a process system.

At least one I/O module 104 is coupled to the sensors 102a and actuators 102b. The I/O modules 104 facilitate interactions with the sensors 102a, actuators 102b, or other field devices. For example, an I/O module 104 could be used to receive one or more analog inputs (AIs), digital inputs (DIs), digital input sequences of events (DISOEs), pulse accumulator inputs (PIs), or other inputs from one or more field devices. An I/O module 104 could also be used to provide one or more analog outputs (AOs), digital outputs (DOs), or other outputs to one or more field devices. As described below, the interactions with one or more field devices occur through one or more intrinsic safety barriers. Each I/O module 104 includes any suitable structure(s) for receiving one or more input signals from or providing one or more output signals to one or more field devices.

The system 100 also includes various controllers 106. The controllers 106 can be used in the system 100 to perform various functions in order to control one or more industrial processes. For example, a first set of controllers 106 may use measurements from one or more sensors 102a to control the operation of one or more actuators 102b. These controllers 106 could interact with the sensors 102a, actuators 102b, and other field devices via the I/O modules 104. A second set of controllers 106 could be used to optimize the control logic or other operations performed by the first set of controllers. A third set of controllers 106 could be used to perform additional functions. It is also possible that one set of controllers could be in a stand-by or load sharing mode to improve overall availability of the system.

Controllers 106 are often arranged hierarchically in a system. For example, different controllers 106 could be used to control individual actuators, collections of actuators forming machines, collections of machines forming units, collections of units forming plants, and collections of plants forming an enterprise. The controllers 106 in different hierarchical levels can communicate via one or more networks 108 and associated switches, firewalls, and other components.

Each controller 106 includes any suitable structure for controlling one or more aspects of an industrial process. At least some of the controllers 106 could, for example, represent proportional-integral-derivative (PID) controllers or multivariable controllers, such as Robust Multivariable Predictive Control Technology (RMPCT) controllers or other types of controllers implementing model predictive control (MPC) or other advanced predictive control. As a particular example, each controller 106 could represent a computing device running a real-time operating system, a WINDOWS operating system, or other operating system.

The network 108 couples the controllers 106 and other devices in the system 100. The network 108 facilitates the transport of information between components. The network 108 could represent any suitable network or combination of networks. As particular examples, the network 108 could represent at least one Ethernet network.

Operator access to and interaction with the system 100 and other components of the system 100 can occur via various operator stations 110. Each operator station 110 could be used to provide information to an operator and receive information from an operator. For example, each operator station 110 could provide information identifying a current state of an industrial process to an operator, such as values of various process variables and warnings, alarms, or other states associated with the industrial process. Each operator station 110 could also receive information affecting how the industrial process is controlled, such as by receiving setpoints for process variables controlled by the controllers 106 or other information that alters or affects how the controllers 106 control the industrial process. Each operator station 110 includes any suitable structure for displaying information to and interacting with an operator.

Multiple operator stations 110 can be grouped together and used in one or more control rooms 112. Each control room 112 could include any number of operator stations 110 in any suitable arrangement. In some embodiments, multiple control rooms 112 can be used to control an industrial plant, such as when each control room 112 contains operator stations 110 used to manage a discrete part of the industrial plant.

This represents a brief description of one type of industrial process control and automation system that may be used to manufacture or process one or more materials. Additional details regarding industrial process control and automation systems are well-known in the art and are not needed for an understanding of this disclosure. Also, industrial process control and automation systems are highly configurable and can be configured in any suitable manner according to particular needs.

In particular embodiments, the various controllers 106 and operator stations 110 in FIG. 1 may represent computing devices. For example, each of the controllers and operator stations could include one or more processing devices, such as one or more microprocessors, microcontrollers, digital signal processors (DSPs), field programmable gate arrays (FPGAs), application specific integrated circuits (ASICs), or discrete circuitry. Each of the controllers 106 and operator stations 110 could also include one or more memories for storing instructions and data used, generated, or collected by the processing device(s), such as a random access memory, read only memory, Flash memory, optical disc, hard drive, or any other suitable volatile or non-volatile storage device(s). Each of the controllers 106 and operator stations 110 could further include at least one network interface, such as one or more Ethernet interfaces or wireless transceivers.

In process control and automation systems such as the system 100, I/O channels are used to connect controllers (such as the controllers 106) and field devices (such as the sensors 102a and actuators 102b). In general, the I/O modules 104 or other devices can support I/O channels of various types, including AIs, DIs, DISOEs, PIs, AOs, or DOs. Different I/O channel types are characterized by different inputs, outputs, voltages, currents, and configurations. A universal I/O (UIO) channel is a specialized I/O channel that is reconfigurable to operate as any of multiple I/O channel types. Example types of UIO circuits are shown in U.S. Pat. No. 8,072,098; U.S. Pat. Nos. 8,392,626; 8,656,065; and U.S. Patent Publication No. 2015/0278144 (all of which are hereby incorporated by reference in their entirety). UIO circuits that support UNIVERSAL CHANNEL TECHNOLOGY available from HONEYWELL INTERNATIONAL INC. are also suitable for use.

As described in more detail below, the I/O modules 104 or other components of the system 100 can include intrinsic safety (IS) barriers that allow sensors, actuators, or other field devices to be used in hazardous environments or other environments. In this example, the sensors 102a and actuators 102b are used in a hazardous environment 114, which may also be referred to a hazardous location or "HazLoc" area. The intrinsic safety barriers include energy limiting devices and can provide galvanic isolation (GI) for the sensors, actuators, and other field devices. These intrinsic safety barriers can be implemented with improved channel densities, improved or optimized space utilization, and reduced costs. The described approaches can be used with traditional I/O channels, universal I/O channels, or other suitable I/O channels or combinations of I/O channels.

In some embodiments, each I/O module 104 could support up to sixteen or thirty-two I/O channels and include an intrinsic safety barrier for each I/O channel. However, these numbers are examples only, and other numbers of I/O channels and intrinsic safety barriers could be used. Also, in some embodiments, the I/O module 104 could still fit within the available space for an I/O module in a cabinet or other structure, even though the I/O module 104 is used with a large number of intrinsic safety barriers.

The use of intrinsic safety barriers could be supported in any suitable I/O modules 104 or other devices. For example, in some embodiments, each I/O module 104 could include only universal digital input, digital output, and/or digital input/output channels along with the intrinsic safety barriers. However, an I/O module 104 could support any number(s) and type(s) of I/O channels.

Additional details regarding example intrinsic safety barriers are provided below. Note that these details relate to specific implementations of intrinsic safety barriers and that other embodiments of the intrinsic safety barriers could also be used. For example, specific voltages, numbers of I/O modules or I/O channels, numbers of intrinsic safety barriers, and redundancy configurations may be described below, although any other suitable values could be used.

Although FIG. 1 illustrates one example of an industrial process control and automation system 100, various changes may be made to FIG. 1. For example, the system 100 could include any number of sensors, actuators, I/O modules, controllers, operator stations, networks, intrinsic safety barriers, and other components. Also, the makeup and arrangement of the system 100 in FIG. 1 is for illustration only.

Components could be added, omitted, combined, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates one example operational environment in which one or more intrinsic safety barriers can be used. This functionality can be used in any other suitable system, and the system need not be related to industrial process control and automation.

Figure 2:
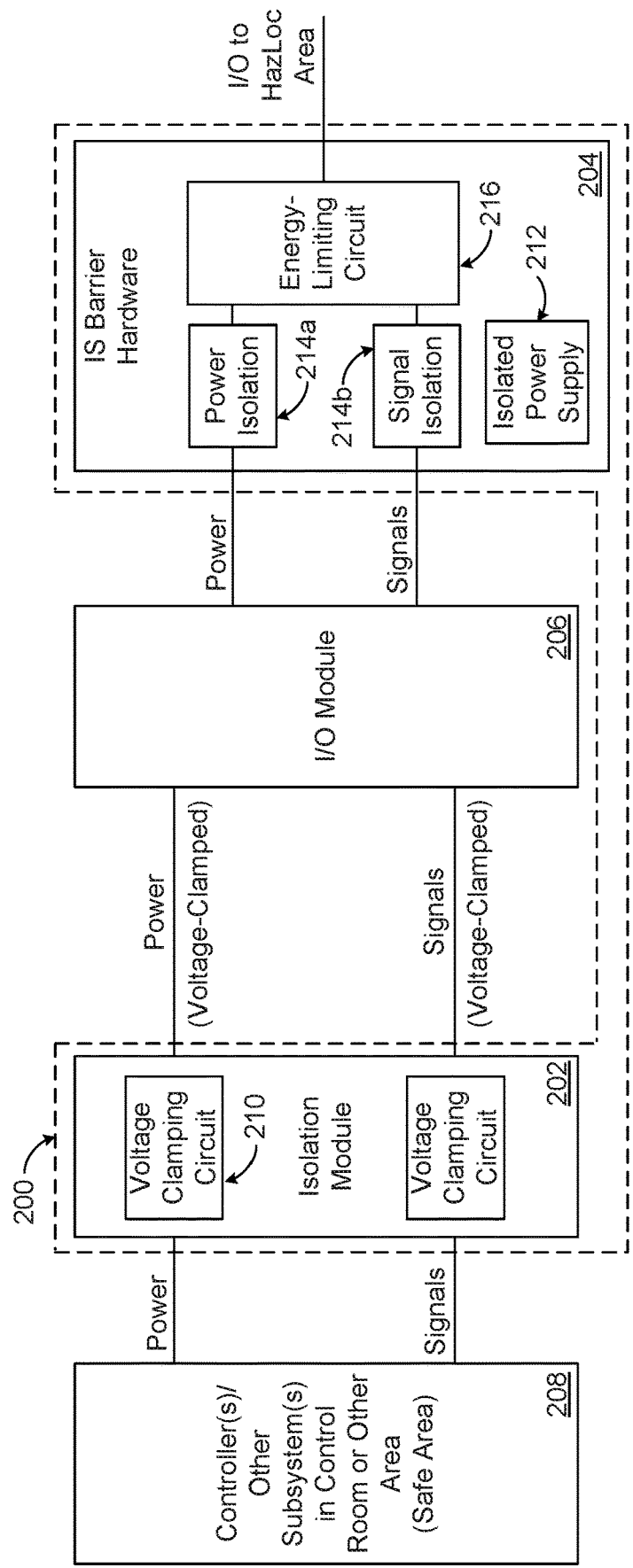
FIG. 2 illustrates an example intrinsic safety barrier with an associated energy limiting apparatus according to this disclosure.

FIG. 2 illustrates an example intrinsic safety barrier 200 with an associated energy limiting apparatus according to this disclosure. For ease of explanation, the intrinsic safety barrier 200 may be described as being used in the I/O modules 104 in the industrial process control and automation system 100 of FIG. 1. However, the intrinsic safety barrier 200 could be used with any suitable devices and in any suitable systems (whether or not those devices and systems relate to industrial process control and automation). Also, note that the intrinsic safety barrier 200 may be described below in the context of a specific intrinsic safety standard, such as IEC 60079-xx. However, compliance with other intrinsic safety standards is also possible.

According to IEC 60079-11, any signal coming from a safe area is considered as a potential carrier of 250V, which needs to be voltage-clamped and energy-limited before passing to a hazardous location. This 250V assessment is often difficult for barrier certification, which can result in the selection of bulky protection devices that increase the size and cost of the barrier and reduce channel density. To help with these or other issues, the intrinsic safety barrier 200 in FIG. 2 is split into two separate hardware components, namely an isolation module 202 and IS barrier hardware 204. The isolation module 202 and the IS barrier hardware 204 are used in conjunction with at least one I/O module 206, which could represent any of the I/O modules 104 of FIG. 1. Among other things, this division helps to facilitate easier safety assessment of the intrinsic safety barrier 200.

The isolation module 202 operates to clamp power or communication signals from a controller or other subsystem 208 in a safe area, such as to a voltage that complies with a relevant safety standard (like IEC 60079-xx). In some embodiments, the isolation module 202 can clamp power or communication signals from 250V to a much lower voltage. Thus, the isolation module 202 could be assessed for 250V and can optionally have an isolating element. Depending on the implementation, the isolation module 202 could perform voltage clamping and galvanic isolation for the power and communication signals. In particular embodiments, the isolation module 202 can perform voltage clamping and galvanic isolation for both serial communication (such as RS485) and DC power (such as 24 VDC) coming from a controller cabinet or other source, although other power or communication signals could be used. Also, in particular embodiments, the isolation module 202 could be implemented according to suitable guidelines for use in a "zone 0," "zone 1," or "zone 2" environment.

As described in more detail below, in some embodiments, one or more voltage clamping circuits 210 can be used in the isolation module 202. Each voltage clamping circuit 210 could be passive or active. This portion of the intrinsic safety barrier 200 may require an "ia," "ib," "ic," or other safety assessment since the outputs of the isolation module 202 are fed to another subsystem that includes the IS barrier hardware 204. Each voltage clamping circuit 210 could therefore undergo an "ia," "ib," or "ic" assessment for 250V inputs, as well as for thermal assessment. Galvanic isolation could be provided before or after an active voltage clamp (if used). Each voltage clamping circuit 210 includes any suitable structure for limiting the voltage of a power signal or at least one communication signal. In some embodiments, resistive elements could be used as a power and current limiting circuit for communication channels or other channels carrying data signals to or from a safe area. Suitable isolation techniques (such as opto, transformer, or capacitive) may be implemented for channels carrying data signals.

Outputs of the isolation module 202 can be functionally the same as inputs of the isolation module 202, but (as far as the safety assessment is concerned) the outputs of the isolation module 202 are voltage-limited. In some cases, the outputs are voltage-limited to a voltage lower than 250V, although the exact value depends on the design. Subsequent systems connecting to the outputs of the isolation module 202 would not need go through a 250V or other assessment for IS purposes. This is because the subsequent systems connecting to the outputs of the isolation module 202 would only receive voltage-clamped signals from the isolation module 202.

In some embodiments, multiple instances of the isolation module 202 could be used, and one or multiple instances of the IS barrier hardware 204 can be coupled to the outputs of each of the isolation modules 202. Also, in some embodiments, each of the isolation modules 202 could be installed in a safe zone, "zone 0," "zone 1," or "zone 2." Further, in some embodiments, isolation modules 202 can optionally have a 1:1 redundancy or other redundancy configuration to improve overall system availability. Note that an isolation module 202 by itself need not be certified as a subsystem; rather, certification may only be needed when the isolation module 202 is used in combination with the IS barrier hardware 204.

The IS barrier hardware 204 provides energy limiting and isolation circuitry for one or more I/O channels supported by the I/O module(s) 206. However, the IS barrier hardware 204 does not need to be assessed for 250V or other voltage clamping functionality for IS compliance since the inputs to the IS barrier hardware 204 come through the isolation module 202 (which does comply with 250V or other assessment outputs). Thus, the inputs to the IS barrier hardware 204 are already safety-assessed for a lower voltage. The energy limiting and isolation circuitry of the IS barrier hardware 204 can still be assessed for intrinsic safety, such as per the IEC 60079-11 standard or other suitable standard.

As described in more detail below, in some embodiments, the IS barrier hardware 204 includes an isolated power supply 212, isolators 214*a*-214*b* for power and communication signals, and at least one current limiter or other energy-limiting circuit 216. The isolated power supply 212 includes any suitable source of electrical power that provides electrical isolation. For example, the isolated power supply 212 could include a transformer that operates as an isolating element. Each isolator 214*a*-214*b* includes any suitable structure for providing electrical isolation for power or at least one communication signal. For instance, the isolators 214*a*-214*b* for power and communication signals could include opto, transformer, or capacitive elements that operate as isolating elements. Each energy-limiting circuit 216 includes any suitable structure for limiting electrical energy provided from the IS barrier hardware 204. As an example, the energy-limiting circuit 216 could be implemented using resistive elements near the outputs of the IS barrier hardware 204.

Multiple instances of the IS barrier hardware 204 could be interfaced to one isolation module 202 to help control the overall cost of the intrinsic safety barrier 200. However, multiple isolation modules 202 (each with one or multiple instances of the IS barrier hardware 204) could also be used. In specific embodiments, two isolation modules 202 provide 1:1 redundancy and are coupled to two I/O modules 206 (which also provide 1:1 redundancy), and one instance of the IS barrier hardware 204 is coupled to the two I/O modules 206. In some embodiments, the isolation modules 202, IS barrier hardware 204, and I/O modules 206 can all be installed within the same cabinet or other structure. Note, however, that this is not necessarily required, and the intrinsic safety barrier 200 could be installed or used in any other suitable manner.

In this type of design approach, intrinsic safety can be provided at a lower cost and smaller space per channel, which can allow for an improved channel density. Moreover, the smaller size of the intrinsic safety barrier 200 can help with integration within larger devices or systems, as well as with the overall cost for a project. Further, the intrinsic safety barrier 200 could find use in a large number of hardware devices. In addition, the IS barrier hardware 204 does not need to go through 250V or other safety assessment, which can provide tremendous advantages for designers with respect to component ratings, sizes, channel densities, and hardware costs. This helps in the development of hardware with high channel densities and lower costs, which is typically not possible with existing third-party solutions.

Note that a number of other features could also be supported by the intrinsic safety barrier 200. For example, the isolation module 202 and the IS barrier hardware 204 could be packaged as separate subsystems. The intrinsic safety barrier 200 could support the use of any suitable type(s) and number(s) of I/O channels in any suitable combination, including fixed and universal I/O channels. Each instance of the isolation module 202 and of the IS barrier hardware 204 could be independently accessed and replaced while keeping one or more controllers "on process" (meaning the one or more controllers maintain constant control over an industrial process or portion thereof). Each instance of the isolation module 202 and of the IS barrier hardware 204 could be approved for live insertion and removal.

There are various ways in which an intrinsic safety barrier 200 can be packaged and installed along with one or more I/O modules 206. For example, one or more intrinsic safety barriers 200 can be used with an Input/Output Termination Assembly ("IOTA"). The IOTA generally represents a structure through which other components (such as controllers 106) communicate with the I/O modules 206. The isolation modules 202 of the intrinsic safety barriers 200 can be installed in any suitable location(s), such as at or near a power supply of a cabinet. The IS barrier hardware 204 of the intrinsic safety barriers 200 can be separate hardware and can also be installed in any suitable location(s), such as on the IOTA.

Although FIG. 2 illustrates one example of an intrinsic safety barrier 200 with an associated energy limiting apparatus, various changes may be made to FIG. 2. For example, the intrinsic safety barrier 200 could include any suitable number of isolation modules 202 and IS barrier hardware 204 and could be used in conjunction with any suitable number of I/O modules 206. Also, the intrinsic safety barrier 200 could be used with any other suitable device(s) and need not be used with an I/O module.

Figure 3:
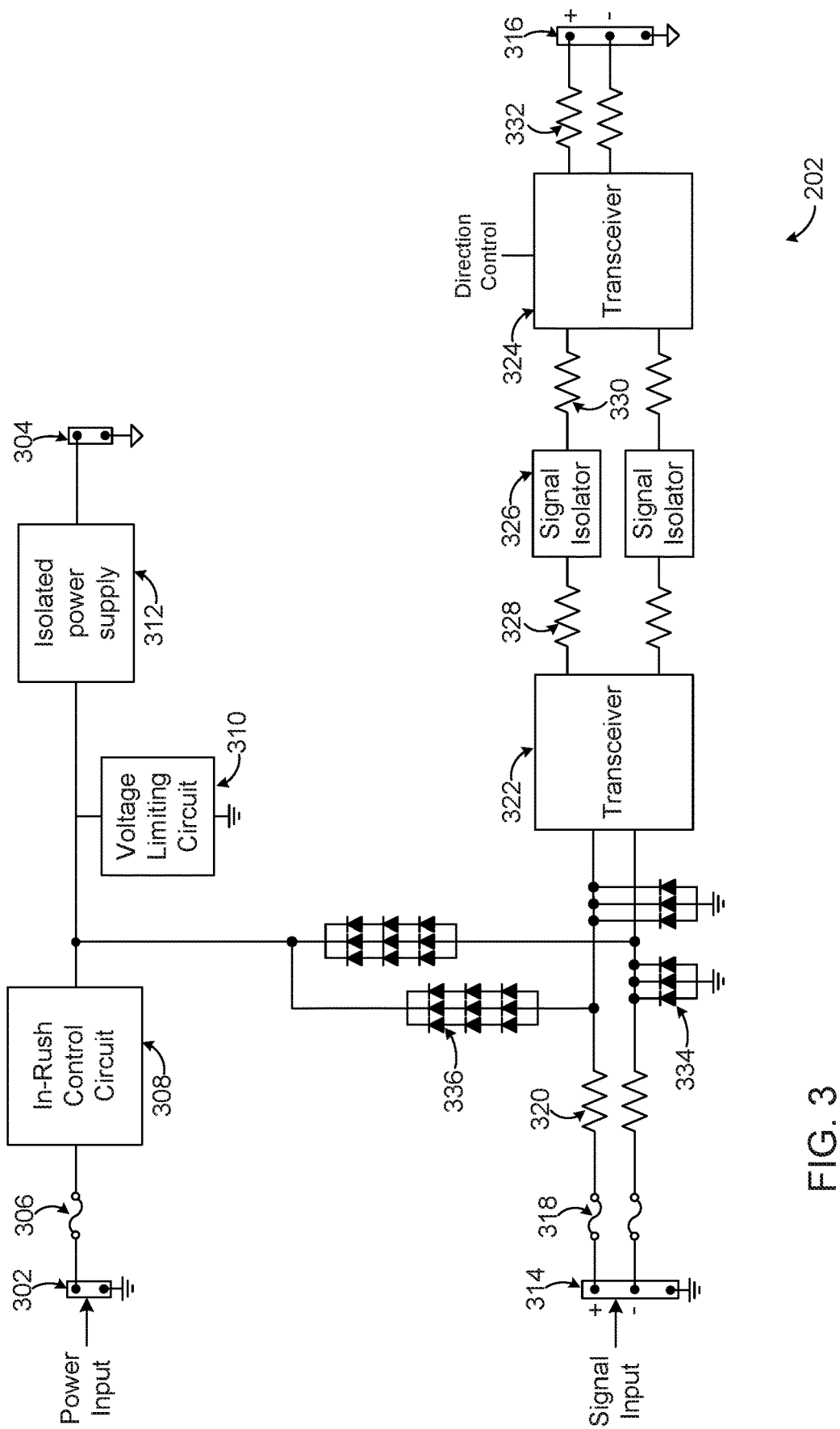
FIG. 3 illustrates an example implementation of an isolation module in the intrinsic safety barrier of FIG. 2 according to this disclosure.

FIG. 3 illustrates an example implementation of an isolation module 202 in the intrinsic safety barrier 200 of FIG. 2 according to this disclosure. Note that the example implementation of the isolation module 202 shown in FIG. 3 is for illustration only. The isolation module 202 could be implemented in any other suitable manner without departing from the scope of this disclosure.

As shown in FIG. 3, the isolation module 202 includes a first input connector 302 and a first output connector 304. The input connector 302 is configured to receive an input power signal into the isolation module 202, and the output connector 304 is configured to provide a voltage-clamped output power signal from the isolation module 202. Each connector 302 and 304 includes any suitable structure configured to receive or provide an electrical signal, such as a 24 VDC signal.

The input power signal passes through the input connector 302 and is received at a fuse 306. The fuse 306 represents a structure configured to break in order to prevent excessive current from flowing further into the isolation module 202. An in-rush control circuit 308 is configured to receive the input power signal through the fuse 306 and to limit the current passing through the control circuit 308, such as when the isolation module 202 is initially powered-on. The in-rush control circuit 308 can also perform other functions, such as by providing short-circuit protection and reverse polarity protection.

A voltage limiting circuit 310 is coupled to the output of the in-rush control circuit 308. The voltage limiting circuit 310 generally operates to prevent an overvoltage condition from propagating to downstream components coupled to the output connector 304. For example, the voltage limiting circuit 310 could selectively create one or more short-circuit or low-resistance paths to ground when an overvoltage condition occurs. In some embodiments, the voltage limiting circuit 310 can withstand a 250V input and allow a significantly smaller voltage to be passed to the output connector 304. The voltage limiting circuit 310 could also have a rapid response time, such as about 10 s or less. In addition, the voltage limiting circuit 310 could maintain a suitable temperature during a fault condition. The voltage limiting circuit 310 includes any suitable structure configured to protect against an overvoltage condition, such as one or more crowbar circuits.

An optional isolated power supply 312 can be positioned between (i) the in-rush control circuit 308 and the voltage limiting circuit 310 and (ii) the output connector 304. The isolated power supply 312 receives the input power signal from the in-rush control circuit 308 and provides a voltage-clamped output power rail to the output connector 304. The isolated power supply 312 also helps to electrically isolate the in-rush control circuit 308 and the voltage limiting circuit 310 from the output connector 304. In some embodiments, the isolated power supply 312 includes a transformer. In particular embodiments, the isolated power supply 312 is designed to comply with an IEC 60079-xx standard or other similar standard in order to support use in a HazLoc area.

The isolation module 202 also includes a second input connector 314 and a second output connector 316. The input connector 314 is configured to receive an input data signal into the isolation module 202, and the output connector 316 is configured to provide a voltage-clamped output data signal from the isolation module 202. Each connector 314 and 316 includes any suitable structure configured to receive or provide a data signal. Note that in this example, the input data signal is a differential data signal, such as an RS485 signal, so there are positive and negative terminals in the connectors 314 and 316, as well as separate electrical paths for the positive and negative portions of the input data signal. However, this is not required, and a single-ended input data signal could be used here.

The two portions of the input data signal pass through the input connector 314 and are received at respective fuses 318. Each fuse 318 represents a structure configured to break in order to prevent excessive current from flowing further into the isolation module 202. The two portions of the input data signal also pass through respective protection circuits 320, each of which is implemented in this example using a resistor. In some embodiments, each protection circuit 320 can withstand a 250V input.

Two transceivers 322 and 324 are used to transmit the two portions of the input data signal across respective signal isolators 326. For example, the transceiver 322 could receive the input data signal from the protection control circuits 320, regenerate the input data signal if needed, and transmit the input data signal towards the signal isolators 326. The transceiver 324 could receive signals from the signal isolators 326, regenerate the input data signal, and transmit the regenerated input data signal towards the output connector 316. Optionally, data can flow in both directions through the isolation module 202, and one or both transceivers 322 and 324 could be configured to receive a data direction control signal that controls the direction of data transport.

Each transceiver 322 and 324 includes any suitable structure for transmitting or receiving a data signal, such as an RS485 or other serial data transceiver. Note that while transceivers are shown here, one transceiver 322 or 324 could represent a transmitter and the other transceiver 324 or 322 could represent a receiver if data transport occurs in a single direction through the isolation module 202. Each signal isolator 326 includes any suitable structure for electrically isolating a data communication pathway. For example, each signal isolator 326 could include an opto-isolator that uses a photodiode to convert an electrical signal into light and a photodetector to convert the light back into an electrical signal. However, other isolation techniques (such as transformer or capacitive techniques) could be used here.

For each of the two portions of the input data signal, a respective resistor 328 and a respective resistor 330 are positioned on opposite sides of each isolator 326. Moreover, a respective resistor 332 is positioned between the transceiver 324 and the output connector 316. Each resistor 328-332 could have any suitable resistance.

Multiple parallel diodes 334 can be coupled to the output of each protection control circuit 320. These diodes 334 help to clamp the voltages that appear at the inputs to the transceiver 322. Note that while three parallel diodes 334 are used here for each input to the transceiver 322, any number of diodes 334 (including a single diode) could be used. Similarly, various diodes 336 are connected in series and in parallel with each other and are coupled between the inputs to the transceiver 322 and the output from the in-rush control circuit 308. These diodes 334-336 are used to couple any overvoltage appearing on the signal path to the input of the voltage limiting circuit 310. This allows the same voltage limiting circuit 310 to clamp the overvoltage in the power and signal paths. Note, however, that separate voltage limiting circuits could also be used for the power and signal paths. Note that while each set of diodes 336 includes three parallel-coupled lines (each line with three series-coupled diodes), any number of diodes 336 in any suitable arrangement could be used.

In particular embodiments, the components in the isolation module 202 can be configured for use in a wide temperature range, such as between about −40° C. and +70° C. Also, in particular embodiments, the components in the isolation module 202 can undergo an "ia" assessment or other suitable assessment. Further, in particular embodiments, a redundant pair of isolation modules 202 can be used in each of multiple columns of a cabinet. Of course, one or more isolation modules 202 could be used in any other suitable manner.

Although FIG. 3 illustrates one example implementation of an isolation module 202 in the intrinsic safety barrier 200 of FIG. 2, various changes may be made to FIG. 3. For example, while specific components and specific values are provided above, these are examples only, and any other suitable components or values could be used in the isolation module 202. Also, if a single-ended input data signal is received, a single path may be used between the input connector 314 and the output connector 316.

Figure 4:
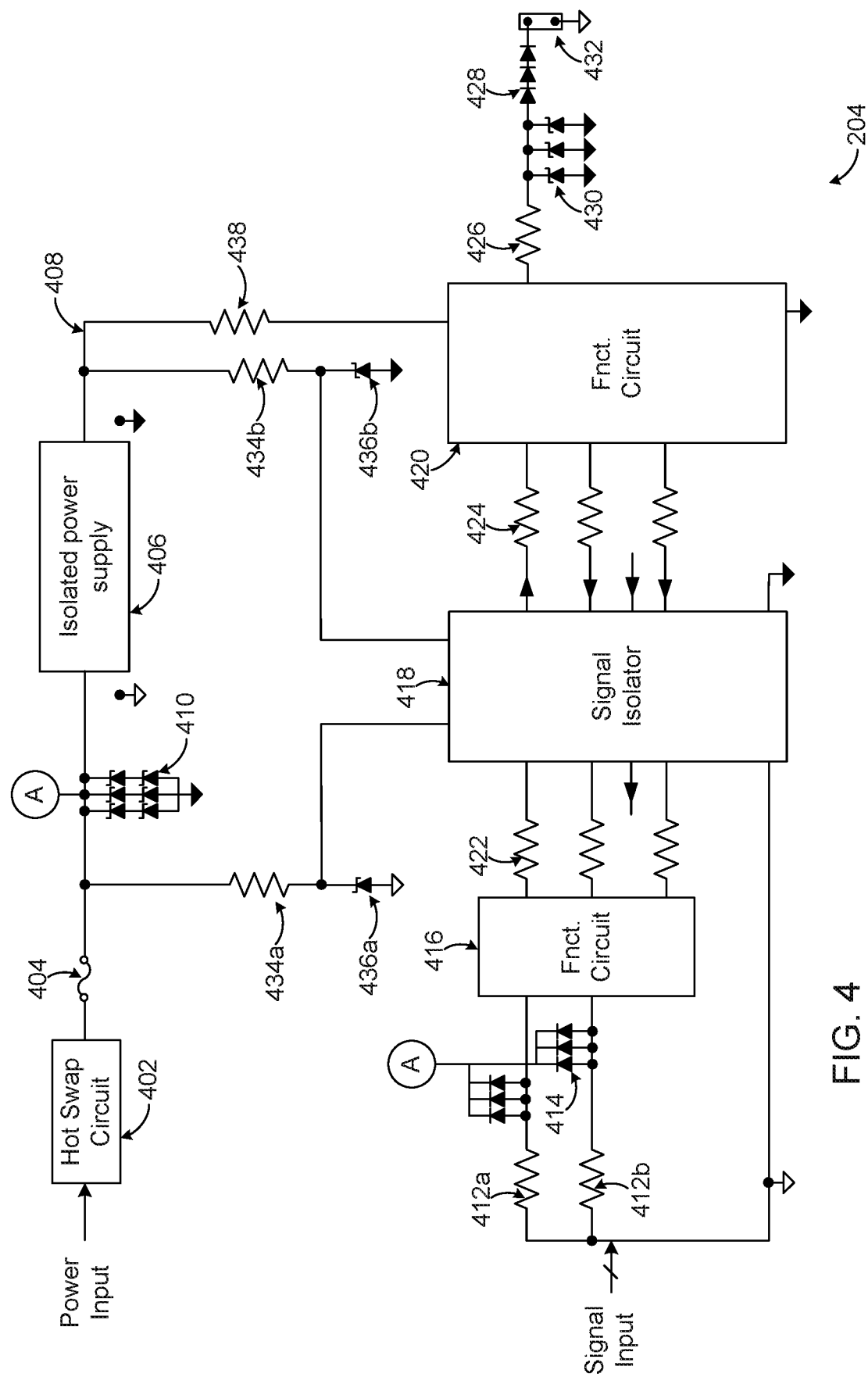
FIG. 4 illustrates an example implementation of intrinsic safety barrier hardware in the intrinsic safety barrier of FIG. 2 according to this disclosure.

FIG. 4 illustrates an example implementation of intrinsic safety barrier hardware 204 in the intrinsic safety barrier 200 of FIG. 2 according to this disclosure. Note that the example implementation of the IS barrier hardware 204 shown in FIG. 4 is for illustration only. The IS barrier hardware 204 could be implemented in any other suitable manner without departing from the scope of this disclosure.

As shown in FIG. 4, an input power signal received by the IS barrier hardware 204 is provided to a hot swap circuit 402. The input power signal could be provided from the output connector 304 of the isolation module 202. Alternatively, the input power signal could be provided from an I/O channel, such as one of multiple I/O channels supported by an I/O module 206. The hot swap circuit 402 allows the IS barrier hardware 204 to be inserted into a powered-on system and limits in-rush current during the insertion. The input power signal from the hot swap circuit 402 is received at a fuse 404. The fuse 404 represents a structure configured to break in order to prevent excessive current from flowing further into the IS barrier hardware 204. An isolated power supply 406 can be positioned between the fuse 404 and a power supply line 408. The isolated power supply 406 receives the input power signal from the fuse 404 and provides a corresponding output power signal over the power supply line 408. The isolated power supply 406 also helps to electrically isolate the fuse 404 from the power supply line 408 and could include a transformer.

Multiple Zener diodes 410 are connected in series and in parallel with each other and are coupled between ground and the input to the isolated power supply 406. The Zener diodes 410 help to clamp the voltage that appears at the input to the isolated power supply 406. Note that the use of the Zener diodes 410 is optional and they may be omitted if power is drawn through the output connector 304 of the isolation module 202. If power is drawn from one of the I/O channels of an I/O module 206, the Zener diodes 410 can be used. Any suitable Zener diodes 410 could be used here. Note that while the set of Zener diodes 410 includes three parallel-coupled lines (each line with two series-coupled Zener diodes), any number of Zener diodes 410 in any suitable arrangement could be used.

The IS barrier hardware 204 receives an input data signal from an I/O module 206 or other source. In this example, the input data signal is a differential data signal, such as an RS485 signal, so again there are separate electrical paths for the positive and negative portions of the input data signal. However, this is not required, and a single-ended input data signal could be used here.

The two portions of the input data signal pass through respective resistors 412a-412b. Each of the resistors 412a-412b could have any suitable resistance. A set of parallel-coupled diodes 414 is connected to each of the resistors 412a-412b and to the input of the isolated power supply 406. Note that while three parallel diodes 414 are used here for each of the resistors 412a-412b, any number of diodes 414 (including a single diode) could be used.

The two portions of the input data signal are provided from the resistors 412a-412b to a functional circuit 416. The functional circuit 416 operates to condition the differential data signal for input to a signal isolator 418. For example, the functional circuit 416 could perform level shifting and signal conditioning to prepare the differential data signal for input to the signal isolator 418.

The signal isolator 418 operates to electrically isolate signals being used by the functional circuit 416 and a functional circuit 420. For example, the signal isolator 418 could receive an incoming signal from the functional circuit 416 and provide an electrically-isolated replica of the signal to the functional circuit 420 (or vice versa). As a particular example, the signal isolator 418 could use one or more transformers to electrically isolate the signals used by the functional circuit 416 and the functional circuit 420. Various resistors 422 are used on the signal lines between the functional circuit 416 and the signal isolator 418. Also, various resistors 424 are used on the signal lines between the signal isolator 418 and the functional circuit 420. Each of the resistors 422 and 424 could have any suitable resistance.

The functional circuit 420 processes the incoming data signal from the signal isolator 418 into a form suitable for transmission out of the intrinsic safety barrier 200 and to a field device or other destination. For example, the functional circuit 420 could convert the differential data signal into a single-ended data signal that is output from the functional circuit 420. The functional circuit 420 could also ensure that the single-ended data signal complies with any specified protocol or other guidelines, such as by ensuring that the single-ended data signal has a desired voltage or current level. The functional circuit 420 could further optionally supply power received from the isolated power supply 406 to the field device or other destination. In some embodiments, the functional circuit 420 could represent a digital I/O circuit, although any other suitable circuitry could be used in the functional circuit 420.

The output from the functional circuit 420 passes through a resistor 426 and multiple diodes 428. The resistor 426 is also coupled to multiple parallel-coupled Zener diodes 430. The resistor 426 could have any suitable resistance. Any suitable diodes 428 could be used here. Note that while three series-coupled diodes 428 are used here, any number of diodes 428 (including a single diode) could be used. Any suitable Zener diodes 430 could be used here. Note that while three parallel-coupled Zener diodes 430 are used here, any number of Zener diodes 430 (including a single diode) could be used. The output from the functional circuit 420 is provided to a field device or other destination through an output connector 432, which could be coupled to any suitable pathway to the destination.

The signal isolator 418 and the functional circuit 420 can receive power from the isolated power supply 406. In this example, the two sides of the signal isolator 418 are coupled to the isolated power supply 406 through resistors 434a-434b, respectively. Each of the resistors 434a-434b is respectively coupled in series to a Zener diode 436a-436b. Each of the resistors 434a-434b could have any suitable resistance. Any suitable Zener diodes 436a-436b could be used here, such as those used to provide a 3.3V reference to the signal isolator 418. Also, the functional circuit 420 is coupled to the isolated power supply 406 through a resistor 438. The resistor 438 could have any suitable resistance.

It should be noted that the components 412a-412b, 414-432 shown in FIG. 4 are used to handle a single I/O channel associated with an I/O module 206 or other device. These components could be replicated any suitable number of times to support communications over any suitable number of I/O channels. As a particular example, the IS barrier hardware 204 could include components that support sixteen or thirty-two I/O channels. Moreover, the components 416-424 are used here specifically to support a digital output channel. The IS barrier hardware 204 could include other components in place of the components 416-424 in order to support analog, digital, or other types of input or output channels.

Although FIG. 4 illustrates one example implementation of intrinsic safety barrier hardware 204 in the intrinsic safety barrier 200 of FIG. 2, various changes may be made to FIG. 4. For example, while specific components and specific values (like voltages, currents, and powers) are provided above, these are examples only, and any other suitable components or values could be used in the IS barrier hardware 204. Also, if a single-ended input data signal is received, a single path may be used between the I/O module input and the output connector 432.

Figure 5:
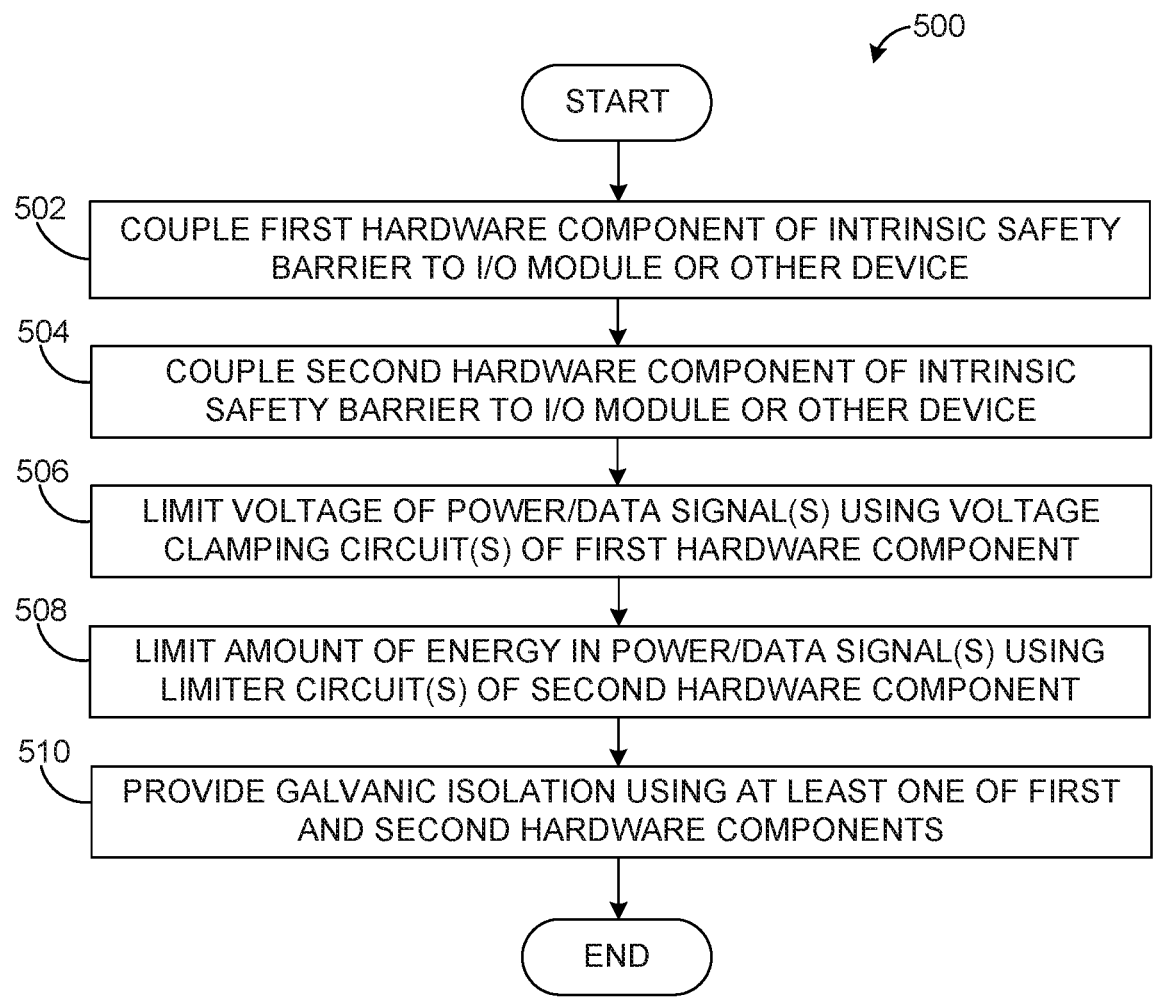
FIG. 5 illustrates an example method for using an intrinsic safety barrier with an associated energy limiting apparatus according to this disclosure.

FIG. 5 illustrates an example method 500 for using an intrinsic safety barrier with an associated energy limiting apparatus according to this disclosure. For ease of explanation, the method 500 is described as being performed using the intrinsic safety barrier 200 of FIG. 2 in the system 100 of FIG. 1. However, the method 500 could be performed using any suitable intrinsic safety barrier designed in accordance with this disclosure, and the intrinsic safety barrier could be used in any suitable system.

As shown in FIG. 5, a first hardware component of an intrinsic safety barrier is coupled to an I/O module or other device at step 502, and a second hardware component of the intrinsic safety barrier is coupled to the I/O module or other device at step 504. This could include, for example, coupling the isolation module 202 of the intrinsic safety barrier 200 to one or more inputs of an I/O module 206 or other device. This could also include coupling the IS barrier hardware 204 of the intrinsic safety barrier 200 to one or more outputs of the I/O module 206 or other device. Optionally, this could further include coupling the isolation module 202 of the intrinsic safety barrier 200 to the IS barrier hardware 204 of the intrinsic safety barrier 200 so that the IS barrier hardware 204 receives a power input from the isolation module 202. In some embodiments, this could include coupling redundant isolation modules 202 and/or redundant IS barrier hardware 204 to one or more I/O modules 206 (such as redundant I/O modules 206).

One or more voltage clamping circuits of the first hardware component are used to limit the voltage(s) of one or more power or data signals at step 506. This could include, for example, one or more voltage clamping circuits 210 of the isolation module 202 operating to clamp the voltages in power and data signals transported through the isolation module 202 and provided to the I/O module 206 or other device. As a particular example, this could include the components of the isolation module 202 shown in FIG. 3 operating to clamp the voltages in power and data signals transported through the isolation module 202 and provided to the I/O module 206 or other device.

One or more limiter circuits of the second hardware component are used to limit the amount(s) of energy contained in the one or more power or data signals at step 508. This could include, for example, one or more energy-limiting circuits 216 of the IS barrier hardware 204 operating to limit the energy contained in the power and data signals received from the I/O module 206 or other device and output to a field device or other destination. As a particular example, this could include the components of the IS barrier hardware 204 shown in FIG. 4 operating to limit the energy contained in the power and data signals received from the I/O module 206 or other device and output to a field device or other destination.

In addition, galvanic isolation is provided using at least one of the first and second hardware components at step 510. This could include, for example, the isolation module 202 or the IS barrier hardware 204 providing galvanic isolation for the power and data signals being transported through the intrinsic safety barrier 200. As particular examples, this could include one or more of the isolated power supply 312 of the isolation module 202 and the isolated power supply 406 of the IS barrier hardware 204 providing the galvanic isolation for the power and data signals being transported through the intrinsic safety barrier 200.

Although FIG. 5 illustrates one example of a method 500 for using an intrinsic safety barrier with an associated energy limiting apparatus, various changes may be made to FIG. 5. For example, while shown as a series of steps, various steps in FIG. 5 could overlap, occur in parallel, occur in a different order, or occur any number of times. As a particular example, steps 506-510 may generally overlap during operation of the intrinsic safety barrier 200.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An integrated intrinsic safety barrier used in at least one I/O module in an industrial process control and automation system comprising:
    a first hardware component coupled between one or more inputs of the at least one I/O module and an output of a controller comprising:
        at least one first input configured to receive at least one first data or power signal;
        at least one voltage clamping circuit configured to limit a voltage of the at least one first data or power signal; and
        at least one first output configured to provide the at least one voltage-limited first data or power signal to one or more inputs of the at least one I/O module,
        wherein the at least one voltage clamping circuit is coupled to the output of an in-rush control circuit through a fuse to limit the in-rush current through the in-rush control circuit, the clamping circuit preventing an overvoltage condition from propagating to downstream components coupled to an output connector of the integrated intrinsic safety barrier; and
    a second hardware component coupled between one or more outputs of the at least one I/O module and an input of a field device comprising:
        at least one second input configured to receive at least one second data or power signal, the at least one second data or power signal comprising or based on the at least one voltage-limited first data or power signal;
        at least one limiter circuit configured to limit an amount of energy in the at least one second data or power signal; and
        at least one second output configured to provide the at least one energy-limited second data or power signal,
        wherein the first hardware component and the second hardware component are used in conjunction with the at least one I/O module.

2. The intrinsic safety barrier of claim 1, wherein at least one of the first and second hardware components is configured to provide galvanic isolation.

3. The intrinsic safety barrier of claim 1, wherein the first hardware component comprises one of multiple redundant first hardware components.

4. The intrinsic safety barrier of claim 1, wherein the at least one limiter circuit in the second hardware component comprises at least one current limiter.

5. The intrinsic safety barrier of claim 1, wherein:
    the first hardware component is assessed as limiting voltages to a maximum of 250V; and
    the second hardware component is not assessed as limiting voltages to a maximum of 250V.

6. The intrinsic safety barrier of claim 1, wherein the at least one first output of the first hardware component is configured to provide a power signal to the at least one second input of the second hardware component in order to provide power to the second hardware component.

7. The intrinsic safety barrier of claim 1, wherein:
the at least one first data or power signal contains data; and
the at least one second data or power signal contains the data.

8. A system comprising:
at least one input/output (I/O) module comprising at least one I/O channel; and
at least one integrated intrinsic safety barrier, each integrated intrinsic safety barrier comprising:
a first hardware component coupled between one or more inputs of the at least one I/O module and an output of a controller comprising:
at least one first input configured to receive at least one first data or power signal;
at least one voltage clamping circuit configured to limit a voltage of the at least one first data or power signal; and
at least one first output configured to provide the at least one voltage-limited first data or power signal to one or more inputs of the at least one I/O module,
wherein the at least one voltage clamping circuit is coupled to the output of an in-rush control circuit through a fuse to limit the in-rush current through the in-rush control circuit, the clamping circuit preventing an overvoltage condition from propagating to downstream components coupled to an output connector of the integrated intrinsic safety barrier; and
a second hardware component coupled between one or more outputs of the at least one I/O module and an input of a field device comprising:
at least one second input configured to receive at least one second data or power signal from the at least one I/O module;
at least one limiter circuit configured to limit an amount of energy in the at least one second data or power signal; and
at least one second output configured to provide the at least one energy-limited second data or power signal,
wherein the first hardware component and the second hardware component are used in conjunction with the at least one I/O module.

9. The system of claim 8, wherein at least one of the first and second hardware components of each intrinsic safety barrier is configured to provide galvanic isolation.

10. The system of claim 8, wherein the at least one limiter circuit in the second hardware component of each intrinsic safety barrier comprises at least one current limiter.

11. The system of claim 8, wherein:
the first hardware component of each intrinsic safety barrier is assessed as limiting voltages to a maximum of 250V; and
the second hardware component of each intrinsic safety barrier is not assessed as limiting voltages to a maximum of 250V.

12. The system of claim 8, wherein each intrinsic safety barrier comprises a redundant pair of first hardware components.

13. The system of claim 12, wherein the at least one I/O module comprises a redundant pair of I/O modules.

14. The system of claim 8, wherein the at least one I/O channel comprises one or more reconfigurable I/O channels.

15. A method for an integrated intrinsic safety barrier used in at least one I/O module in an industrial process control and automation system comprising:
coupling a first hardware component of the integrated intrinsic safety barrier between one or more inputs of at least one I/O module and an output of a controller the first hardware component comprising:
at least one first input configured to receive at least one first data or power signal;
at least one voltage clamping circuit configured to limit a voltage of the at least one first data or power signal; and
at least one first output configured to provide the at least one voltage-limited first data or power signal to one or more inputs of the first device,
wherein the at least one voltage clamping circuit is coupled to the output of an in-rush control circuit through a fuse to limit the in-rush current through the in-rush control circuit, the clamping circuit preventing an overvoltage condition from propagating to downstream components coupled to an output connector of the integrated intrinsic safety barrier; and
coupling a second hardware component of the integrated intrinsic safety barrier between one or more outputs of the at least one I/O module and an input of a field device, the second hardware component comprising:
at least one second input configured to receive at least one second data or power signal, the at least one second data or power signal comprising or based on the at least one voltage-limited first data or power signal;
at least one limiter circuit configured to limit an amount of energy in the at least one second data or power signal; and
at least one second output configured to provide the at least one energy-limited second data or power signal to one or more second devices,
the first hardware component and the second hardware component are used in conjunction with the at least one I/O module.

16. The method of claim 15, further comprising:
limiting the voltage of the at least one first data or power signal using the at least one voltage clamping circuit; and
limiting the amount of energy in the at least one second data or power signal using the at least one limiter circuit.

17. The method of claim 15, further comprising:
providing galvanic isolation using at least one of the first and second hardware components.

18. The method of claim 15, further comprising:
coupling multiple redundant first hardware components to the first device.

19. The method of claim 15, wherein the at least one limiter circuit in the second hardware component comprises a current limiter.

20. The method of claim 15, wherein:
the first hardware component is assessed as limiting voltages to a maximum of 250V; and
the second hardware component is not assessed as limiting voltages to a maximum of 250V.

* * * * *